(12) United States Patent
Simard et al.

(10) Patent No.: US 7,374,730 B2
(45) Date of Patent: May 20, 2008

(54) PROCESS AND APPARATUS FOR SYNTHESIS OF NANOTUBES

(75) Inventors: Benoit Simard, Orléans (CA); Michael Barnett, Ottawa (CA); Stéphane Dénommée, Carleton Place (CA); Dean Ruth, Ottawa (CA)

(73) Assignee: National Research Council of Canada, Ottawa, Ontario (CA)

( * ) Notice: Subject to any disclaimer, the term of this patent is extended or adjusted under 35 U.S.C. 154(b) by 427 days.

(21) Appl. No.: 10/472,214

(22) PCT Filed: Mar. 26, 2002

(86) PCT No.: PCT/CA02/00427

§ 371 (c)(1),
(2), (4) Date: Jan. 26, 2004

(87) PCT Pub. No.: WO02/076887

PCT Pub. Date: Oct. 3, 2002

(65) Prior Publication Data

US 2004/0109814 A1 Jun. 10, 2004

Related U.S. Application Data

(60) Provisional application No. 60/278,434, filed on Mar. 26, 2001.

(51) Int. Cl.
*C10B 13/00* (2006.01)
(52) U.S. Cl. .................................................. 422/186
(58) Field of Classification Search ................. 422/186
See application file for complete search history.

(56) References Cited

U.S. PATENT DOCUMENTS

| 4,710,346 A | * | 12/1987 | Rossman ..................... 419/68 |
| 4,955,717 A | * | 9/1990 | Henderson .................. 356/316 |
| 5,482,601 A | | 1/1996 | Ohshima et al. |
| 5,811,187 A | * | 9/1998 | Anderson et al. ........... 428/403 |
| 6,063,243 A | | 5/2000 | Zettl et al. |
| 6,141,094 A | * | 10/2000 | Tong ........................... 356/300 |
| 6,183,714 B1 | | 2/2001 | Smalley et al. |

OTHER PUBLICATIONS

Ago et al, "Gas-phase synthesis of single-wall carbon nanotubes from colloidal solution of metal nanoparticles", Journal of Physical Chemistry B., Nov. 1, 2001.
Kamalakaran et al., "Synthesis of thick and crystalline nanotube arrays by spray pyrolysis", Applied Physics Letters, American Institute of Physics, vol. 77, No. 21, Nov. 2000.

(Continued)

*Primary Examiner*—Stuart Hendrickson
(74) *Attorney, Agent, or Firm*—Gail C. Silver; Borden Ladner Gervais LLP

(57) ABSTRACT

The invention relates to a process for formation of carbon nanotubes. The process comprises laser ablation of a bulk metal catalyst within a hydrocarbon solution to produce a feedstock containing metal catalyst nanoparticles. The feedstock is atomizing to form a feedstock aerosol. The aerosol is heated to form naotubes. An apparatus for forming carbon nanotubes is also disclosed. Nanoparticles formed in the feedstock according to the invention can be controlled to achieve a narrow size distribution, which ultimately allows for good control over size and chirality of the nanotubes formed.

10 Claims, 9 Drawing Sheets

OTHER PUBLICATIONS

Mayne, et al., "Pyrolytic production of aligned carbon nanotubes from homogeniously dispersed benzene-based aerosols", Chemical Physics Letters, 338, Apr. 20, 2001, 101-107.

Narducci et al., "Modelling of aerosol-assisted chemical vapor co-deposition of NiO and carbon nanotubes", Journal de Physique IV, Editions de Physique, vol. 9, No. 8, Sep. 1999.

Lee, et al., "Conductivity Enhancement in single-walled carbon nanotube bundles doped with K and Br", *Nature* 388:257 (Jul. 17, 1997).

Andrews et al., "Continuous Production of Aligned Carbon Nanotubes: A Step Closer to Commercial Realization", Chemical Physics Letters 303 (1999), pp. 467-474.

Cheng et al., "Large-Scale and Low-Cost Synthesis of Single-Walled Carbon Nanotubes by the Catalytic Pyrolysis of Hydrocarbons", American Institute of Physics Applied Physics Letters, vol. 72, No. 25, Jun. 22, 1998, pp. 3282-3284.

Rao et al., "Continuous Production of Aligned Carbon Nanotubes", American Carbon Society, 1999 Proceedings, pp. 76-77.

* cited by examiner

Step 1: laser ablate bulk metal catalyst within hydrocarbon solution

↓

*feedstock formed
containing metal catalyst nanoparticles*

↓

Step 2: atomize feedstock

↓

*feedstock aerosol formed*

↓

Step 3: heat feedstock aerosol

↓

*nanotubes formed*

FIG. 1

PROCESS AND APPARATUS FOR SYNTHESIS OF NANOTUBES

This application is the National Phase application of International Patent Application Ser. No. PCT/CA02/00427, filed on Mar. 26, 2002. This application is entitled to the benefit of and claims priority from U.S. Provisional Patent Application No. 60/278,434 filed on Mar. 26, 2001, the entirety of which is herein incorporated by reference.

FIELD OF THE INVENTION

The present invention relates to a process and apparatus for synthesis of nanotubes, and to the nanotubes so formed.

BACKGROUND OF THE INVENTION

Carbon nanotubes hold great promises in many areas of technology and fundamental research. Nanotube technology has a wide variety of applications in industry and sciences, including: field emission, conductive plastics, fuel cells, storage media such as hydrogen storage for fuel cells, conductive adhesives, and many advanced materials to name a few.

Single walled nanotubes and multi walled nanotubes (SWNT and MWNT, respectively) have been formed.

SWNTs can be synthesised by an arc-discharge method, using metal-filled graphite rods. U.S. Pat. No. 5,482,601, issued Jan. 9, 1996 to Ohshima et al., describes such a technique. U.S. Pat. No. 6,063,243, issued May 16, 2000, to Zettl et al., also describes a process and apparatus for producing nano-scale tubes and particles. This document discloses a particular electrode for use arc-discharge methodology. Arc-discharge techniques are impractical for large-scale production of nano-scale tubes and particles, because the yield is low and the resulting product has a high impurity content.

A laser ablation method for nanotube production is known to produce SWNTs with a much higher yield and fewer impurities than the arc-discharge method. An article entitled "Conductivity enhancement in single-walled carbon nanotube bundles doped with K and Br" by Lee et al., Nature 388:255-257 (Jul. 17, 1997) reports that bundles of SWNT were prepared by metal-catalysed laser ablation of graphite. U.S. Pat. No. 6,183,714, issued Feb. 6, 2001 to Smalley et al. describes a method of making SWNTs involving laser vaporization of carbon with a Group VIII transition metals, followed by condensation of the vapor. However, these laser ablation methods are not amenable to large-scale production of nanotubes.

A chemical vapour deposition (CVD) method has been disclosed for nanotube synthesis. The CVD method is capable of controlling growth direction on a substrate. There are two types of CVD syntheses of SWNTs, depending on the form of supplied catalyst. One type of synthesis requires that the catalyst be embedded in a porous material or supported on a substrate. The catalyst is placed at a fixed position within a furnace and heated in the presence of a hydrocarbon gas flow. The other type of CVD synthesis involves use of a gas phase for introducing the catalyst, in which both the catalyst and reactant hydrocarbon gas are fed into a furnace. This is followed by a catalytic reaction in a gas phase. In both methods, catalyst nanoparticles are formed through thermal decomposition of organometal compounds such as iron pentacarbonyl and ferrocene.

Currently available techniques for the synthesis of single-walled and multi-walled carbon nanotubes produce only gram quantities per day of crude material at a very high cost of production Only a fraction of this crude material contains nanotubes, and within the nanotubes there is a distribution of diameters and chirality or "helicity", in the case of SWNT. The diameter of nanotubes synthesized according to these conventional techniques can range from 0.4 nm to several nanometers, and within a given diameter there could be several chiral species of SWNT. Thus, these techniques suffer from the lack of control in purity of material produced (diameter and chirality). The diameter and chirality of SWNT influence their physical and chemical properties.

SWNTs have applications in several emerging technologies including nanoelectronics, drug delivery systems, fuel cells and chemical sensors. MWNTs, have applications in the fields of nanoelectronics and advanced materials such as composites for use in fuel cell technologies.

Two major problems arise in conventional SWNT synthesis: large-scale production and quality control. By quality control, such parameters as chirality selection, or diameter controlled, and diameter distribution of the resulting nanotubes must be considered Although scaling-up production of nanotubes could be accomplished by increasing the size and number of apparatus used, such an approach would not lead to a decrease in production price or in increase in product quality. Economically speaking, scaling up current methods is not a viable option. Thus, there is a need for an efficient method of nanotube synthesis that can be conducted on a large scale.

Formation of carbon nanotubes is catalyzed by mixed or pure transition metal particles. It has been demonstrated that the diameters of the metal particles influence the diameters of the resulting nanotubes. However, current synthesis methods have no or little control on the size of the metal particles. They rely on the synthesis of nanometer size particles from organometallic precursors. There exists no method for the synthesis of carbon nanotubes with a narrow diameter distribution. Therefore, there is a need for a method of nanotube synthesis that allows for control of diameter and chirality (in the case of SWNT).

SUMMARY OF THE INVENTION

It is an object of the present invention to provide a process and an apparatus for synthesis of nanotubes that overcome at least one of the limitations of the prior art methodologies.

The present inventors have produced carbon nanotubes by using laser ablation of a bulk metal catalyst within a hydrocarbon solution to produce a feedstock which is then passed through an oven in aerosol form. By exposing the bulk metal catalyst to laser vaporization in situ, metal catalyst nanoparticles are formed within the hydrocarbon solution.

Advantageously, the present invention does not rely on arc discharge or the presence of an anode-cathode arrangement. Thus, the invention can be scaled-up for large-scale synthesis of carbon nanotubes. As a further advantage, the invention realizes good control of size distribution of nanoparticles in the feedstock, which in turn allows for a narrow range of size distribution of the resulting nanotubes.

According the present invention, there is provided a process for synthesis of nanotubes comprising the steps of: laser ablating a bulk metal catalyst within a hydrocarbon solution to produce a feedstock containing metal catalyst nanoparticles; atomizing the feedstock to form a feedstock aerosol; and heating the feedstock aerosol to form nanotubes.

The process includes steps of laser ablation of a bulk metal catalyst located in a hydrocarbon solution, optionally in the presence of a stabilizing agent. Formation of metal catalyst nanoparticles in the feedstock solution according to this process advantageously allows good control over size distribution of the nanoparticles, and ultimately of the nanotubes formed.

Additionally, the invention provides a process for preparation of a nanotube feedstock solution containing metal catalyst nanoparticles comprising the steps of: laser ablating a bulk metal catalyst within a hydrocarbon solution to produce metal catalyst nanoparticles; and adding a stabilizer to the hydrocarbon solution to form a nanotube feedstock solution.

Further, the invention provides an apparatus for formation of nanotubes comprising: a laser for ablating a bulk metal catalyst in the presence of a hydrocarbon solution to form a feedstock containing metal catalyst nanoparticles; an atomizer for vaporizing the feedstock to form a feedstock aerosol; and a furnace adjacent the atomizer through which the feedstock aerosol is flowable, to allow formation of nanotubes.

The invention advantageously allows control of parameters that effect the structure of the resulting nanotubes. For example, the size or density of the nanoparticles formed in the feedstock during the ablation step can be pre-determined so as to obtain a particular type of nanotube. If smaller nanotubes are desired, smaller nanoparticles may be formed, which may involve changing laser-related parameters or the feedstock composition, for example the amount or type of stabilizing agent used.

Thus, there is also provided a process for controlling synthesis of single-walled or multi-walled nanotubes comprising the steps of: selecting parameters appropriate for single-walled or multi-walled nanotube formation; laser ablating a bulk metal catalyst within a hydrocarbon solution under the selected parameters to produce a feedstock containing metal catalyst nanoparticles; atomizing the feedstock to form a feedstock aerosol; and heating the feedstock aerosol to form single-walled or multi-walled nanotubes.

Nanotubes formed according to the process of the invention also fall within the scope of the invention.

BRIEF DESCRIPTION OF THE DRAWINGS

Preferred embodiments of the present invention will now be described, by way of example only, with reference to the attached Figures.

FIG. 1 is a flow diagram illustrating the process for synthesis of nanotubes according to the invention.

DETAILED DESCRIPTION OF THE INVENTION

Figure 2:
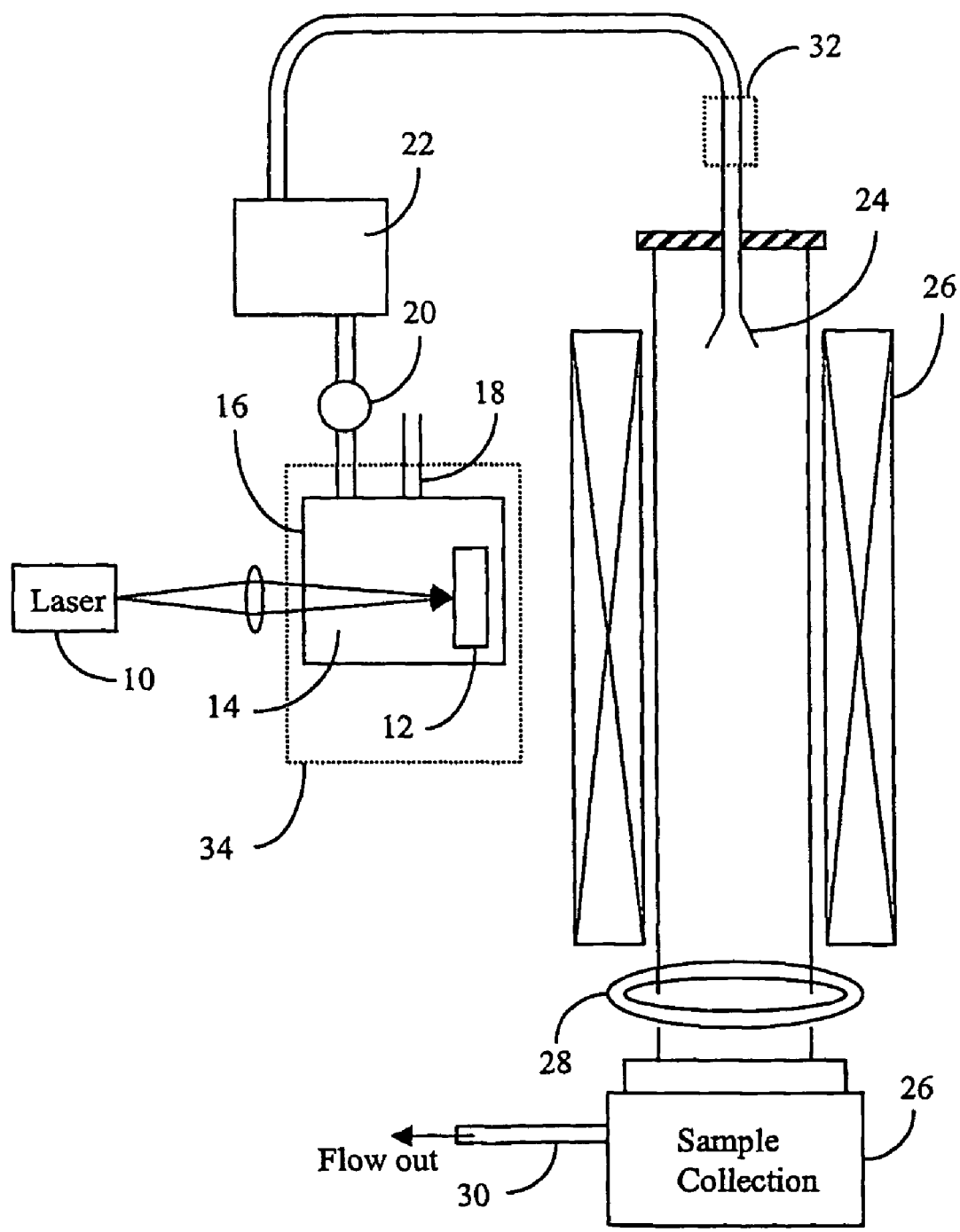
FIG. 2 is a schematic diagram of the apparatus in accordance with one embodiment of the invention.

The invention provides process for synthesizing nanotubes. The process comprises the steps of: performing laser ablation of a bulk metal catalyst in a hydrocarbon solution to generate a feedstock, which contains nanoparticles formed from the bulk metal catalyst. The feedstock is said to be a "nanoparticles-doped" solution of hydrocarbon. The feedstock is atomized, or made into an aerosol that is heated to form nanotubes. The nanotubes so formed can be collected and used for any number of applications.

FIG. 1 illustrates a flow diagram of the process according to the invention. Briefly, a laser us used to ablate the bulk metal catalyst within the hydrocarbon solution in step 1. A feedstock containing nanoparticles of the metal catalyst is formed. In step 2, the feedstock is atomized to form an aerosol. In step 3, the feedstock aerosol is heated, so as to form nanotubes.

Optionally, the laser ablation step may be conducted in the presence of a stabilizing agent. The stabilizing agent may be added to the hydrocarbon solution at a predetermined rate while the laser ablation (or "vaporization") is performed, so that the quantity of stabilizing agent increases as the nanoparticles of metal catalyst form.

The step of atomizing the feedstock can be conducted by flowing the feedstock under pressure with a carrier gas through an aerosol nozzle. Such a nozzle may be located at one end of a furnace, or other heating means, so as to introduce to the aerosol into a heated environment. An aerosol carrier gas projects the feedstock through the furnace. According to one embodiment of the invention, the feedstock falls through the furnace by gravity in combination with gas flow.

The term "bulk" when used in combination with the metal catalyst merely refers to the physical size of the metal to be used. Prior to ablation, the metal catalyst is sized to be larger than a nanoparticle. For example, the metal catalyst in the "bulk" form may be provided as one or more large solid pieces, or may be broken down into finer solid pieces and provided as a powder in the hydrocarbon solution. The particles within such a powder may be micron-sized, for example. When the bulk metal catalyst is ablated by the laser, nano-sized particles are formed which allows for a higher exposure of surface area of the catalyst compared to the bulk form. The ratio of surface area to volume of the catalyst is greater once the bulk form of the catalyst is ablated to form nanoparticles.

The composition of the metal catalyst according to the invention may be formed of a pure metal selected from a group consisting of Mo, Co, Ni, Fe, and Ru. Mixtues of such pure metals may be used, for example, the metal catalyst material may be a 50/50 mixture of Mo and Co.

In order to vaporize the metal catalyst, a laser beam is directed onto the bulk metal catalyst, thereby vaporizing the metal into nanoparticles. Different lasers may be used, such as for example, $CO_2$ lasers, YAG lasers, or excimer lasers including XeF, ExCl, KrF, KrCl and ArF excimer lasers, as well as argon an krypton ion lasers and solid-state diode lasers. Any laser wavelength can be used. This includes but is not limited to the 10 micron region (e.g., 10.6 nm) of $CO_2$ lasers, the 1064 nm, 532 nm, 355 nm, and 266 nm wavelengths from YAG lasers, the 351 nm from XeF excimer lasers, the 308 nm from XeCl excimer lasers, the 248 nm from KrF excimer lasers, the 222 nm from KrCl excimer lasers, the 193 nm from ArF excimer lasers, and all wavelengths from argon and krypton ions lasers and solid-state diode lasers. The laser beam can be pulsed or continuous. The characteristics of the laser beam can be adjusted to control the vaporization, and influence the average size and size distribution of nanoparticles formed by laser ablation. Further, the laser beam characteristics can be adjusted to control the rate of nanoparticle formation.

A stabilizing agent may be included in the feedstock along with the hydrocarbon solution and the metal catalyst. The stabilizing agent may be a surfactant, a coating agent, or hydrocarbon material capable of preventing coalescence of nanoparticles of metal catalyst in the hydrocarbon solution, or which can be said to arrest the growth of nanoparticles into larger entities. To do this, a stabilizing agent may act as a coating agent to provide a monlayer coating around a nanoparticle. Examples of possible stabilizing agents are thiol family compounds, amine-containing molecules, and thiol/amine containing molecules. As a particular example of a stabilizing agent, dodecanethiol may be used. Preferably, a stabilizing agent is organic and does not influence the catalytic activity of the metal catalyst. When used, the amount of stabilizing agent can vary greatly, depending on the desired result. A typical amount of stabilizing agent is about 1-5% of the feedstock on a volume basis.

When the stabilizing agent is used, coalescence of the ablated nanoparticles of metal catalyst is reduced, thereby preventing formation of bigger and bigger metal particles that could eventually precipitate in the hydrocarbon solution. For continuous processes, in which the feedstock is used quickly or in which a flow-through method is used to continuously remove feedstock once it attains an adequate nanoparticle density, the possibility for coalescence of nanoparticles may be reduced to a point where a stabilizing agent is not required. For continuous processes in which the feedstock is made in excess and held in a sizable quantity or for a length of time adequate to allow coalescence, a stabilizing agent is advantageously used. The process may also be run in batch mode, in which case the presence of a stabilizing agent helps to maintain a constant composition if the feedstock is being prepared prior to the aerosol formation.

Optionally, the nanoparticles may be made in a small cell located close to the aerosol nozzle. To do this, the hydrocarbon solution flows from a reservoir and fills up the small cell, which contains the bulk metal catalyst to be vaporized. The cell may be of a batch type or "flow-through" type to allow for either constant or intermittent emptying of the cell. The volume of the cell is small enough (for example, using a small scale synthesis the cell may range from 0.5 to 10 ml) that the content of the cell flows through or is used up rapidly, thus preventing coalescence of the metal catalyst nanoparticles. Of course, the volume of such a cell can be scaled upward or downward as appropriate for the scale of nanotube synthesis.

The bulk metal catalyst may be ablated in a region close to the nozzle in a flow-through cell, for example. In this way, nanoparticles formed from the bulk metal catalyst can be removed quickly for use in aerosol formation, so as to minimize the aggregation or reactivity. In such an arrangement, it would not be necessary to include a stabilizing agent in the feedstock, although a stabilizing agent could be used.

The aerosol carrier gas may be any appropriate gas capable of carrying the feedstock through an atomizer at high pressure and into a furnace. Gasses such as argon, helium or hydrogen may be used either alone or in combination. A typical gas flow through the atomizer is about 1000 standard cc/minute (sccm). The atomizer may comprise a feedstock outlet nested within a carrier gas outlet, both of which feed into a nozzle through which the feedstock aerosol is sprayed. The feedstock can be injected into the outlet, for example through continuous injection. The feedstock then flows through the nozzle as an aerosol in combination with the carrier gas flow.

The pressure behind the nozzle may be any amount adequate to allow aerosol formation of the feedstock in the carrier gas. The nozzle design allows control the size of the droplets, which in turn effects the nanotubes formation within the furnace. In addition to collection by gravity, a variety of mechanisms are available for collecting nanotubes, including deposition on cooled surfaces or by an electrostatic collector.

The process according to the invention promotes more control of the synthesis of single-walled or multi-walled nanotubes than has heretofore been available. Specifically, at the time the nanoparticles are formed, parameters may be selecting which are appropriate for either single-walled or multi-walled nanotube formation. The laser ablation of a bulk metal catalyst within the hydrocarbon solution is thus carried out under the selected parameters to produce a feedstock containing metal catalyst nanoparticles. These nanoparticles so formed can influence the physical properties of the resulting nanotubes. Single-walled or multi-walled nanotubes can thus be formed. The selected parameters may be, for example, the size of nanoparticles formed in the step of laser ablating. Generally, smaller nanoparticles (for example, 1 nm diameter) produce single-walled nanotubes while larger nanoparticles tend to produce multi-walled nanotubes.

The size of the nanoparticles formed in the ablation step can be controlled by adjusting such parameters as the relative concentration of the stabilizing agent (or surfactant). Thus, for example, the parameter of [surfactant]/[nanoparticle] may be adjusted. Alternative parameters influencing nanotube properties are: whether the surfactant is added while the nanoparticle concentration builds up; the laser fluence, that is to say power per unit area; and the irradiation time or the time period over which the bulk catalyst metal is exposed to laser irradiated.

According to the invention, there is provided an apparatus for synthesizing carbon nanotubes, comprising: a container for holding a hydrocarbon solution and a bulk metal catalyst; a laser source for sending a laser beam through the container for vaporizing the bulk metal catalyst in the presence of a stabilizing agent to produce a feedstock containing metal catalyst nanoparticles; an atomizer for making aerosol of the feedstock; a furnace for reacting the aerosol in a heated environment to form carbon nanotubes, and a collector for collecting carbon nanotubes. Such an apparatus may optionally comprise a storage tank for storing the feedstock; and a pump for transporting the feedstock to the atomizer at a controlled rate of flow, and a source of carrier gas. As a further option, a filter may be included upstream of the atomizer to filter out any given size of particle or nanoparticle that is not desirable to include in formation of an aerosol. Such a filter may be placed at any point downstream of the container for holding the hydrocarbon solution and the bulk metal catalyst.

Further optional components of the apparatus include a port located on the container for introducing the stabilizing agent to the hydrocarbon solution at a predetermined rate while the laser vaporization is performed.

The furnace may be formed of a vertical tube with heater located at its periphery. In such a configuration, the atomizer may be located at the top of the tube and the collector at the bottom.

FIG. 2 is a schematic diagram of the apparatus according to one embodiment of the invention. A laser 10 is focused on a piece 12 of a bulk metal catalyst (e.g., a pure metal or bulk mixed metals) located in the hydrocarbon solution 14 within a container 16. To the hydrocarbon solution, for example toluene, a stabilizing agent (18) is added which is capable of arresting the growth and/or aggregation or self-assembly of nanoparticles following their formation. The laser beam vaporizes (ablates) the metal catalyst in situ and generates metal catalyst nanoparticles which in turn disperse homogeneously within hydrocarbon solution 14 in the container to produce a homogeneous solution. This homogeneous solution is used as a feedstock for the production of carbon nanotubes.

By means of a pump 20 (which may be a syringe for example), the feedstock is transported to storage 22 and is then sent at a controlled rate to an atomizer, such as aerosol nozzle 24. With a help of an inert gas (such as, He, Ar with or without a dopant such as H), the feedstock is discharged into a furnace 26 in the form of aerosol. In this example, the furnace is made of a heated quartz tube and maintained between 800° C. and 1600° C. As the feedstock aerosol falls by gravity and by the inert gas flow through the furnace, the nanotubes form. The nanotubes so formed are collected in a collector 26 by condensation when cooled by coolant 28. The inert gas flows out of the port 30.

The size of the nanoparticles of metal catalyst formed by laser ablation is influenced by such factors as the laser wavelength, fluence (power density), irradiation time, nature and concentration of a stabilizing agent, if present, and the rate at which the stabilizing agent is added. The resulting size distribution of the particles can be as narrow 1 nm or less.

In accordance with a further embodiment, laser ablation of metal catalyst can be conducted on a finely dispersed metal catalyst powder mixed into hydrocarbon solution. The powder is formed of the catalyst metal, such as Mo:Co 50:50. This technique may optionally include filtration of the feedstock to remove the unablated large metal particles prior to entering into the aerosol system. FIG. 2 shows this optional filter in dotted lines designated by indicator numeral 32. The filter can be located before, after or within the feedstock storage 22.

The production of feedstock can be performed continuously by continuous supply of hydrocarbon solution, the stabilizing agent, and the metal catalyst. Alternatively, the production may be performed in batches by replacing the container of feedstock when the content is exhausted by laser ablation. These features are shown in the dotted lines designated as reference numeral 34 indicate an optional outer chamber capable holding a replacement container.

It is also possible to set up the furnace in any other direction, including a horizontal position. In those cases, if the furnace is not vertical, a collection mechanism using the electrostatic force or such other active collection force may be desirable.

Figure 3:
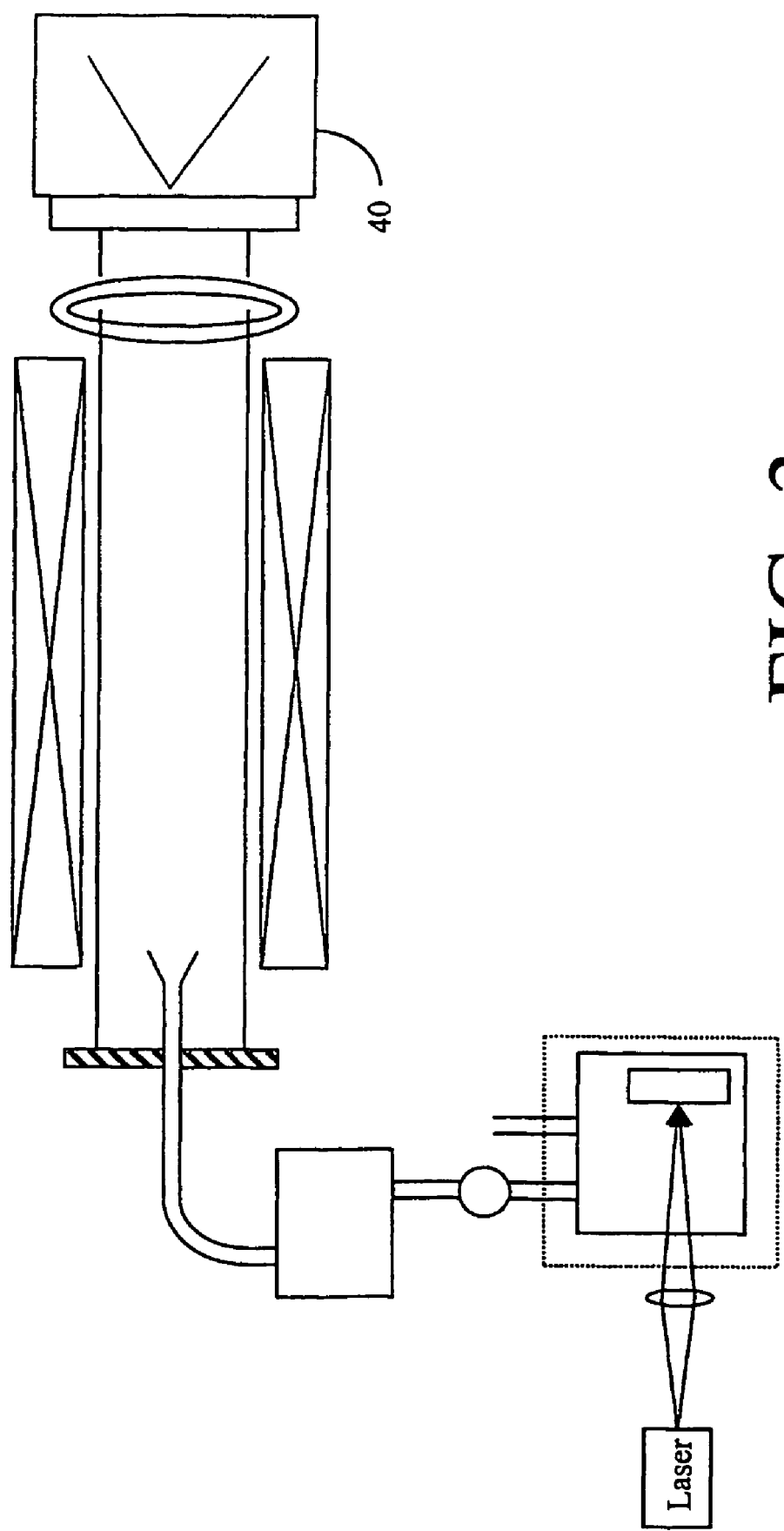
FIG. 3 is a schematic diagram of the apparatus in accordance with a further embodiment of the invention, in which a furnace is positioned horizontally.

FIG. 3 shows one of such arrangements in which the furnace is positioned horizontally. The collector 40 is an electrostatic collector that is electrostatically charged relative to the nanotubes formation, and is thus capable of to efficiently collecting the nanotubes formed in the apparatus.

EXAMPLE 1

Formation of Gold Nanoparticles by Laser Ablation

A solid piece of gold (1 g) is placed within a container containing 100 mL of hexane and 1 mL of dodecanethiol. The metal is exposed to a YAG laser at 532 nm for 2 hours to form gold nanoparticles. The resulting nanoparticles are measured.

Figure 4:
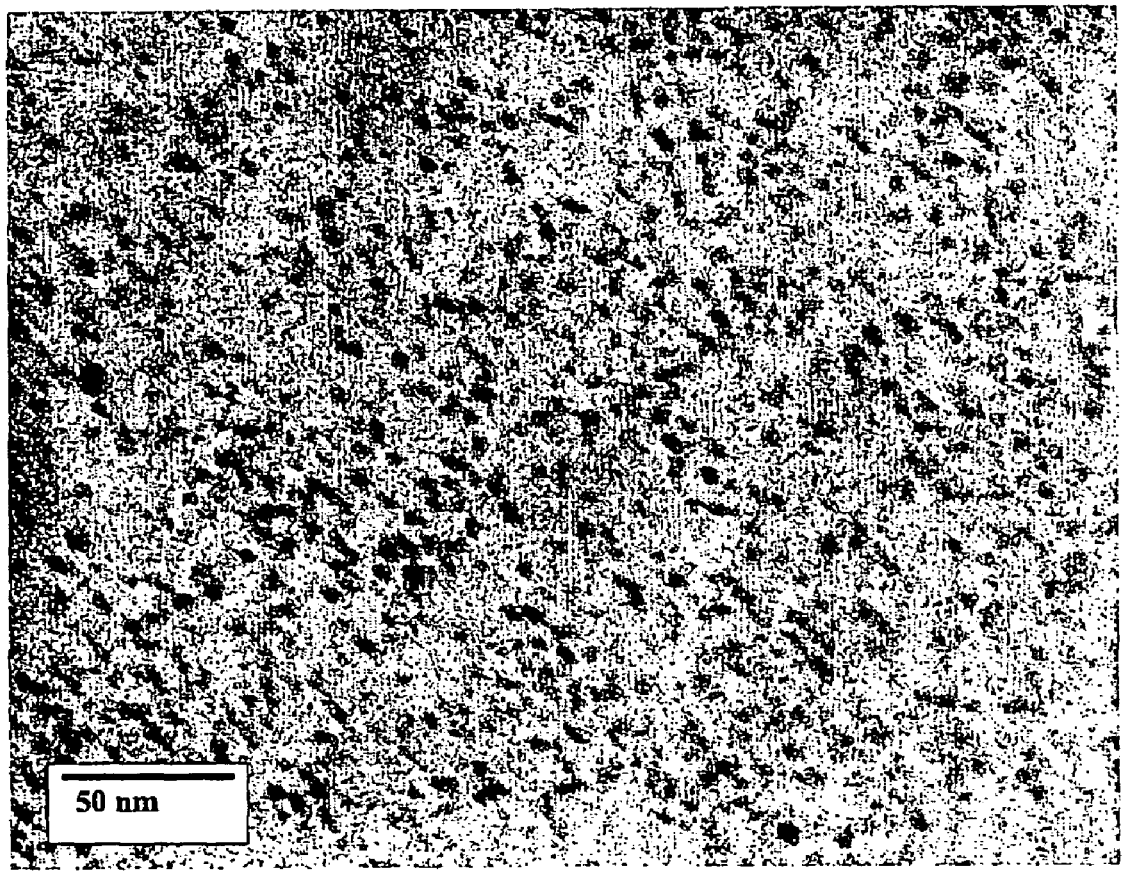
FIG. 4 provides a transmission electron micrograph of gold nanoparticles prepared by laser ablation.

FIG. 4 shows a transmission electron micrograph of the resulting gold nanoparticles prepared by laser ablation in solution according to the invention. The uniform formation of particles consistent in size and less than 10 nm in diameter is evident.

Figure 5:
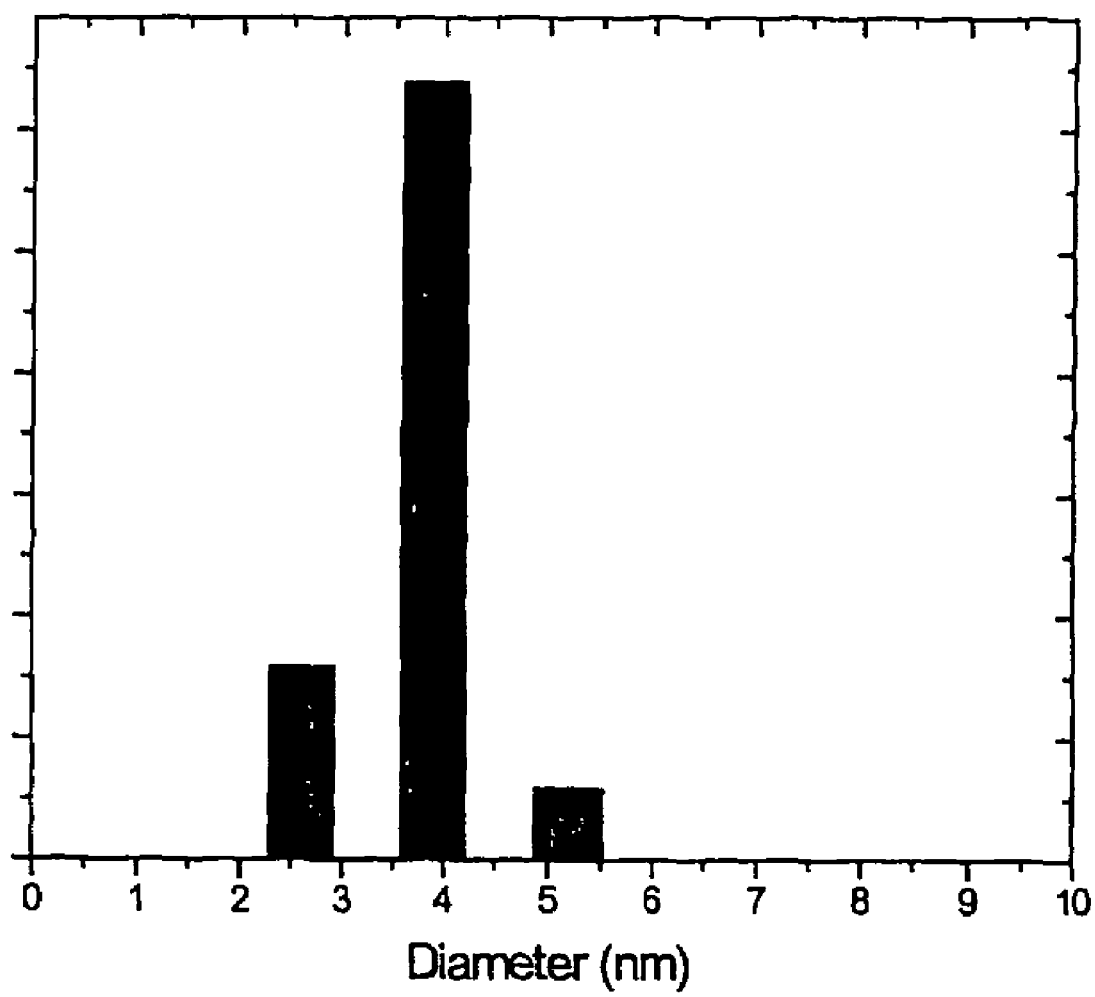
FIG. 5 illustrates size distribution of gold nanoparticles prepared by laser ablation in solution according to the invention.

FIG. 5 illustrates the resulting size distribution of gold nanoparticies so formed. The particles had narrow size distribution, with about 70% of the particles being about 4 nm in diameter, while the remaining particles range from about 2.5 nm to 6 nm in diameter.

EXAMPLE 2

Formation of Nanotubes

A solid piece of 50:50 Co:Mo metal (2 g) is placed within a flow-through container containing 20 mL of toluene and 1 mL of dodecanethiol. The metal is exposed to a YAG laser at 532 nm for 2 hours to form nanoparticles, at which point a desired level of metal content is reached in the solution, thereby forming a feedstock. Feedstock flows out of the container at a rate of 100 μL/minute.

Figure 6:
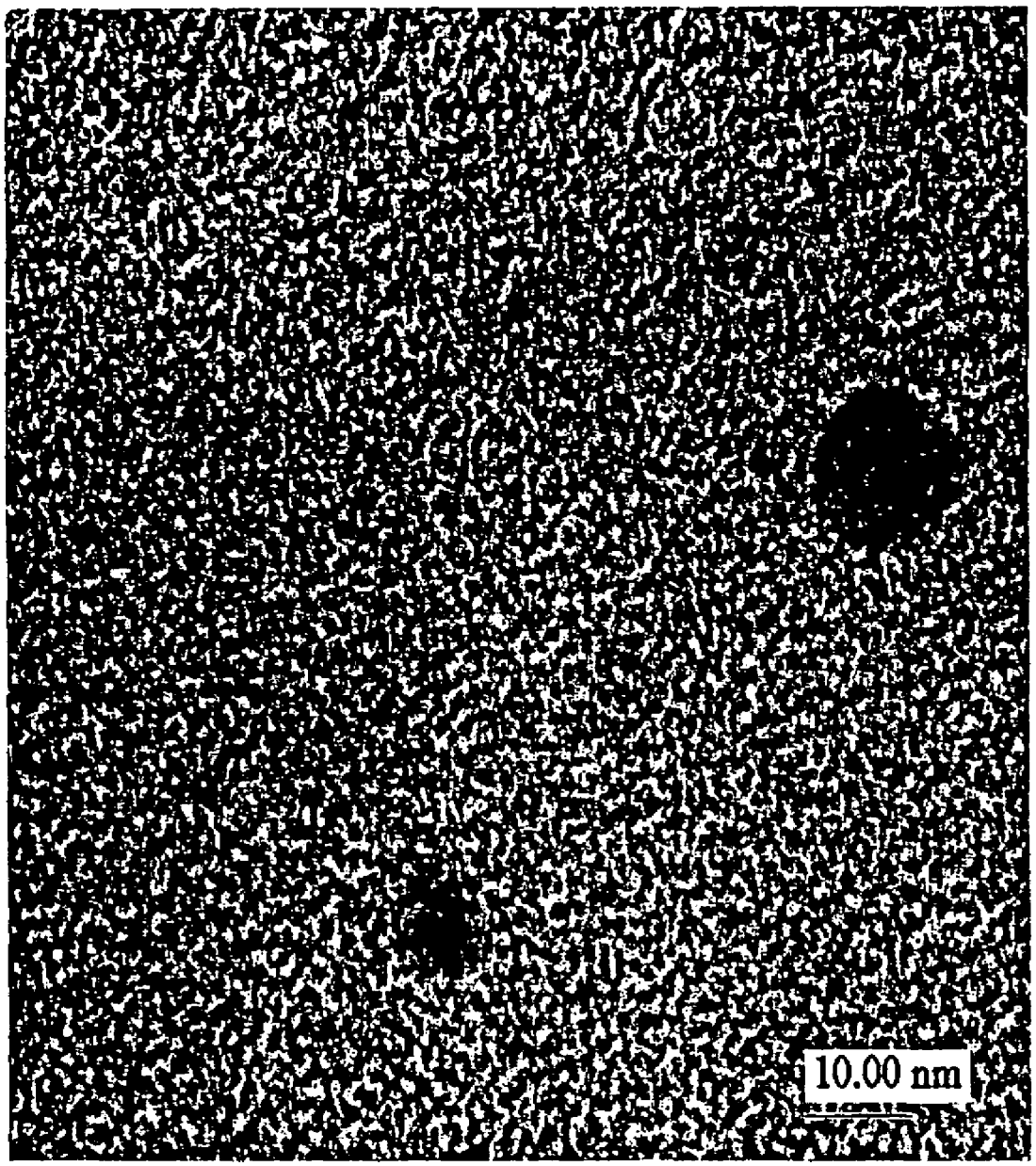
FIG. 6 provides a transmission electron micrograph of CoMo nanoparticles prepared by laser ablation in solution, having diameter of about 6-12 nm.

FIG. 6 shows a transmission electron micrograph of the resulting Co:Mo nanoparticles prepared by laser ablation in solution according to the invention. The uniform formation of particles consistent in size is evident. Generally, the particles range from 6-12 nm in diameter, and are less than about 10 nm in diameter on average.

The feedstock is pumped through an atomizer with argon gas flowing at a rate of 1000 sccm at atmospheric total pressure. The feedstock is thus forced through a nozzle and an aerosol is formed. The nozzle is located at the opening of a furnace heated to 1100° C. As gravity forces the aerosol feedstock through the furnace, nanotubes form and are cooled and collected.

Figure 7:
FIG. 7 illustrates a multi-walled nanotube formed according to the invention.
Figure 8:
FIG. 8 illustrates a grouping of multi-walled nanotubes formed according to the invention.

FIG. 7 is a transmission electron microscope image of a multi-walled nanotube formed according to this example. FIG. 8 is a transmission electron microscope image illustrating a grouping of multi-walled nanotubes formed according to this example. These multi-walled nanotubes have a diameter ranging from about 50 to about 200 nm, and are formed from nanoparticles of approximately 6 nm in diameter.

EXAMPLE 3

Formation of NiCo Nanoparticles

Figure 9:
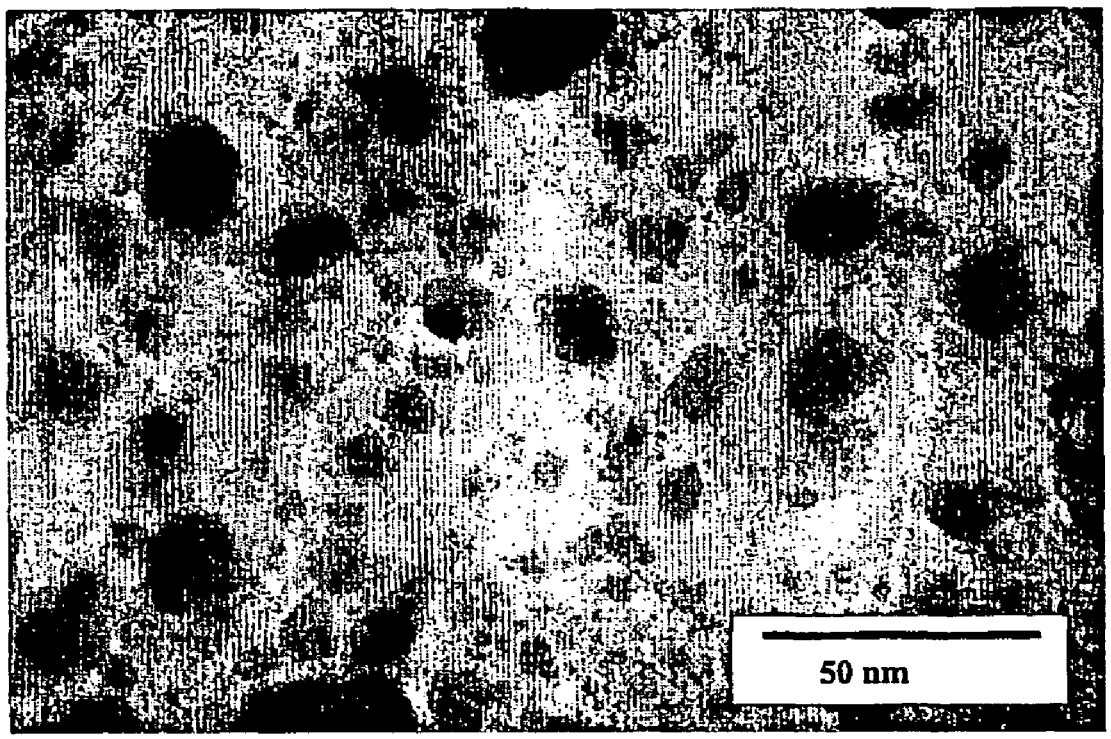
FIG. 9 provides a transmission electron micrograph of NiCo nanoparticles formed according to the invention.

A solid piece of 50:50 Ni:Co metal (1 g) is placed within a flow-through container containing 20 mL of toluene and 1 mL of dodecanethiol. The metal is exposed to a YAG laser at 532 nm for 2 hours to form nanoparticles, at which point a desired level of metal content is reached in the solution, thereby forming a feedstock. Feedstock flows out of the container at a rate of 100 μL/minute. FIG. 9 is a transmission electron microscope image of NiCo nanoparticles formed according to this method.

The above-described embodiments of the invention are intended to be examples of the present invention. Alterations, modifications and variations may be effected the particular embodiments by those of skill in the art, without departing from the scope of the invention which is defined solely by the claims appended hereto.

The invention claimed is:

1. An apparatus for formation of carbon nanotubes comprising:
   a container containing a hydrocarbon solution and a bulk metal catalyst, the bulk metal catalyst being in contact with the hydrocarbon solution;
   a laser source directed into said container, to ablate the bulk metal catalyst, producing a feedstock comprising metal catalyst nanoparticles dispersed in the hydrocarbon solution;
   an atomizer, comprising an inlet in communication with the container and an outlet, to vaporize the feedstock introduced through the atomizer inlet to form an aerosol that is dispersed through the atomizer outlet;
   a furnace, in communication with the atomizer outlet, and disposed to receive the aerosol dispersed through the atomizer outlet, said aerosol forming carbon nanotubes as the aerosol flows through the furnace; and
   a collector to collect the carbon nanotubes formed in the furnace.

2. The apparatus according to claim 1, wherein the atomizer comprises a nozzle through which a carrier gas is flowable with the feedstock to form a feedstock aerosol.

3. The apparatus according to claim 1, wherein the furnace is capable of heating the feedstock aerosol to a temperature of from about 800° C. to about 1600° C.

4. The apparatus according to claim 1, wherein the container has a continuous flow therethrough.

5. The apparatus of claim 1, further comprising a storage, having an inlet in communication with the container and having an outlet in communication with the atomizer, to store the feedstock formed in the container prior to being sent to the atomizer.

6. The apparatus of claim 5, further comprising a pump connecting the container to the storage to transport the feedstock from the container to the storage.

7. The apparatus of claim 1, further comprising a filter having an inlet in communication with the container and having an outlet in communication with the inlet of the atomizer, to filter the feedstock prior to its entry into the atomizer.

8. The apparatus of claim 1, wherein the collector comprises a coolant to condense the carbon nanotubes for collection.

9. The apparatus of claim 1, wherein the collector is an electrostatic collector, electrostatically charged relative to the carbon nanotubes.

10. The apparatus of claim 1, further comprising a pump connecting the container to the atomizer to transport the feedstock from the container to the atomizer.

* * * * *